United States Patent
Wolff et al.

(10) Patent No.: US 7,076,734 B2
(45) Date of Patent: Jul. 11, 2006

(54) SYSTEMS AND METHODS FOR PROVIDING A DYNAMICALLY CONTROLLABLE USER INTERFACE THAT EMBRACES A VARIETY OF MEDIA

(75) Inventors: Adam G. Wolff, San Francisco, CA (US); David B. Delp, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 554 days.

(21) Appl. No.: 09/887,609

(22) Filed: Jun. 22, 2001

(65) Prior Publication Data

US 2002/0196268 A1 Dec. 26, 2002

(51) Int. Cl.
*H04N 5/44* (2006.01)
*H04N 7/173* (2006.01)
*H04N 5/445* (2006.01)

(52) U.S. Cl. .................... 715/720; 715/718; 725/43; 725/42; 725/44; 725/52

(58) Field of Classification Search .............. 345/841, 345/719, 716, 718, 569; 709/202; 725/52
See application file for complete search history.

(56) References Cited

U.S. PATENT DOCUMENTS

| | | | | |
|---|---|---|---|---|
| 5,585,838 A | * | 12/1996 | Lawler et al. | 725/54 |
| 5,589,892 A | * | 12/1996 | Knee et al. | 725/43 |
| 6,005,601 A | * | 12/1999 | Ohkura et al. | 725/52 |
| 6,061,097 A | * | 5/2000 | Satterfield | 725/44 |
| 6,151,059 A | * | 11/2000 | Schein et al. | 725/37 |
| 6,678,891 B1 | * | 1/2004 | Wilcox et al. | 725/42 |
| 6,690,391 B1 | * | 2/2004 | Proehl et al. | 715/720 |
| 6,765,557 B1 | * | 7/2004 | Segal et al. | 345/173 |
| 6,817,028 B1 | * | 11/2004 | Jerding et al. | 725/52 |

* cited by examiner

*Primary Examiner*—Kristine Kincaid
*Assistant Examiner*—Boris Pesin
(74) *Attorney, Agent, or Firm*—Workman Nydegger

(57) ABSTRACT

Systems and methods for providing a dynamically controllable user interface that embraces a variety of media. A menu system, which interfaces between a user and a variety of media and offers contextual and static options to the user, is capable ratcheting upon receipt of one or more input commands. Contextual options allow a user to control various media, such as television programming and/or web pages, on the television screen, while static options allow a user to execute mini applications while viewing television programming and/or surfing the Internet. The ratcheting menu system that organizes the various options, allows a user to control a variety of media through one menu system, and optimizes the display area on a television screen. The menu system allows for access to television programming while providing authentication to maintain security on web pages.

45 Claims, 15 Drawing Sheets

SYSTEMS AND METHODS FOR PROVIDING A DYNAMICALLY CONTROLLABLE USER INTERFACE THAT EMBRACES A VARIETY OF MEDIA

BACKGROUND OF THE INVENTION

1. The Field of the Invention

The present invention relates to systems and methods for providing a dynamically controllable user interface that embraces a variety of media. More specifically, the present invention is directed to a ratcheting menu system that interfaces between a user and a variety of media displayable on a display device and that maximizes the viewable area on the display device.

2. The Prior State of the Art

Currently, viewers have limited control when interfacing with a television set. For example, input devices, such as buttons, dials and/or a remote control, may be employed by a viewer to perform such functions as turning the power on or off, changing the channel, modifying the volume, and/or adjusting the color, hue, brightness and/or sharpness of the picture.

At times, the use of an input device activates a conventional, basic menu system. By way of example, a menu button may be selected by a viewer to display a menu that provides functions that can be performed to the television set, such as adjusting the color, hue, brightness, or sharpness of the picture. Upon selecting one of the functions, an adjustment mechanism allows the feature to be modified. After the desired functions are performed on the television set, the menu button may be selected again to eliminate the display of the menu system.

Alternatively, a television set may display a similar menu system to allow functions to be performed on a consumer electronic device, such as a videocassette recorder ("VCR"), connected to the television set. In such situations, a separate input device or remote control is often required to perform the functions on the VCR, such as setting the clock or, programming the VCR to record programming that is scheduled to air on a specific channel at a particular time of a given day.

While input devices, such as buttons, dials and/or a remote control, are available to viewers to perform a function to a television set or another consumer electronic device, the functions available are limited and corresponding menu systems that may be available are cumbersome and difficult to manipulate.

SUMMARY OF THE INVENTION

The present invention relates to systems and methods for providing a dynamically controllable user interface that embraces a variety of media. More specifically, the present invention is directed to a ratcheting menu system that interfaces between a user and a variety of media displayable on a display device and that maximizes the viewable area on the display device.

In accordance with the present invention, a ratcheting menu system provides a user interface ("UI") that is employable across a variety of media platforms, such as television programming, electronic mail and Internet web pages. As such, the ratcheting menu system removes distinctions that previously existed between television, electronic mail and the Internet, by allowing a viewer to control a variety of media through a single menu system.

The ratcheting menu system, for example, allows access to television programming and provides authentication to maintain Internet security. The authentication takes place by sending to a set top box limited data, such as the name of the user(s), the password(s), and whether the current user is a subscriber. The data may be downloaded from a server as an extensible markup language ("XML") file to the set top box, which acts as a client. The server instructs the client to refresh its data via a header, which contains the Uniform Resource Locator ("URL") for the XML file.

The ratcheting menu system provides a variety of functions, which may be selected by a user, that include both contextual options (i.e. commands or applications to control the current page or program) and static options (i.e. commands that can be executed at any time, such as sending email). The contextual options available under the menu system allow a user to control television programming and/or web pages displayed on the television, and may include a settings category, a web category, and a television category. Upon selecting one of the categories, corresponding subcategories are available for executing functions or commands that control various aspects specific to the selected category. For example, a subcategory may be selected under the category of television that, for example, displays the title of the program that is currently being displayed and the next program that is scheduled to air on that channel.

The static options available under the menu system allow a user to execute mini applications while viewing television programming and/or surfing the Internet. The mini applications can include, by way of example, composing and sending electronic mail, or receiving a stream of current information (i.e. financial data, current events, sports scores, etc.).

As provided above, the use of the ratcheting menu system maximizes the viewable area on the display screen of a display device. As a category of the ratcheting menu system is selected by a user, the subcategories corresponding to the selected category are listed in a selected position on the display screen that is designed to allow a media platform, such as television programming or a web page, to be displayed in the background. Further, the selected position minimizes the amount of the programming or web page that is hidden by the menu system by restricting the displayed subcategories to a single line. When a user selects a new category, the newly selected category moves to the selected position and the new corresponding subcategory is displayed at the selected position. Therefore, as a user selects categories of the menu system, the system ratchets up or down on the display screen so as to always minimize the amount of programming or web page that is blocked on the display screen by the menu system.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
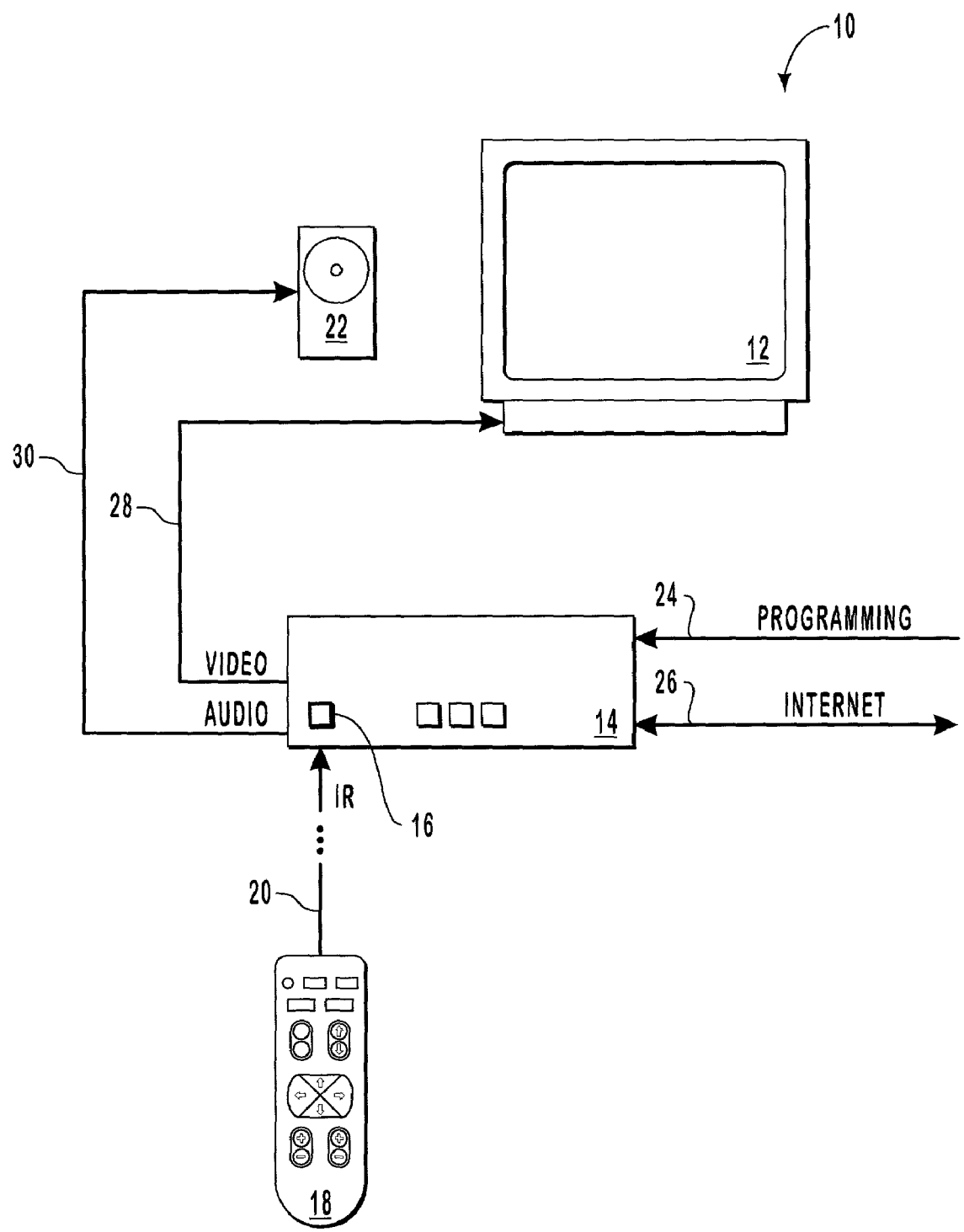
FIG. 1 is a schematic drawing of a suitable operating environment for the present invention.

The present invention extends to both systems and methods for providing a dynamically controllable user interface that embraces a variety of media. More specifically, the present invention is directed a ratcheting menu system that interfaces between a user and a variety of media displayable on a display device and that maximizes the viewable area on the display device.

In the disclosure, reference is made to a user interface platform that is dynamically controllable, modular and extensible, and provides both contextual and static options to a user. In the disclosure and in the claims the term "contextual" refers to options that allow a user to control television programming, web pages, and the like, that are displayed on the television or other display device. Similarly, the term "static" refers to options that allow a user to execute mini applications while viewing television programming and/or surfing the Internet. The mini applications can include, by way of example, composing and/or sending electronic mail ("email"), performing a search for information, receiving a stream of current information (i.e. financial data, current events, sports scores, etc.), and the like, as will be further explained below.

In the disclosure reference is also made to ratcheting a menu system. In the disclosure and in the claims the terms "ratchet," "ratchets" and "ratcheting" refers to shifting an underlying menu on a display screen underneath a selected position while the selected position remains constant. For example, ratcheting a menu system refers to vertically shifting the menu or menu system on a television screen while having the selected position remain constant.

The disclosure also references a menu system that includes and selectively displays a category and subcategory of control. In the disclosure and in the claims the term "subcategory" refers to an option, function, command, application, etc. that is available to a user. Similarly, in the disclosure and in the claims the term "category" refers to a grouping of one or more subcategories, wherein all of the subcategories grouped together are related in some aspect to the category in order to be user friendly.

Embodiments of the present invention are described below by using diagrams to illustrate either the structure or processing of embodiments used to implement the systems and methods for providing a dynamically controllable user interface that embraces a variety of media. Using the diagrams in this manner to describe the present invention should not be construed as limiting its scope.

Embodiments within the scope of the present invention may be implemented within a system that comprises a special purpose or general purpose computer including various computer hardware. Set top boxes that enhance the capabilities of conventional televisions represent an example of a special purpose computer. The embodiments may further comprise multiple computers linked in a networked environment.

Embodiments also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The following disclosure of the present invention is grouped into two subheadings, namely "Exemplary Operating Environment" and "Dynamically Controllable User Interface." The utilization of the subheadings is for convenience of the reader only and is not to be construed as limiting in any sense.

Exemplary Operating Environment

In one embodiment, the present invention is implemented in a system that uses a conventional television screen or other display device to display information and includes a networked computer for composing, sending and receiving email, browsing the World Wide Web ("Web"), accessing other segments of the Internet, and otherwise displaying information. By way of example, such a system includes a WebTV® set-top box or a similar Internet terminal that has been adapted to perform the operations disclosed herein. A WebTV® set-top box uses standard telephone lines, Integrated Services Digital Network (ISDN) lines, cable lines associated with cable television service, or the like to connect to the Internet or other wide area networks.

FIG. 1 and the corresponding discussion are intended to provide a general description of a suitable environment in which the invention may be implemented. FIG. 1 specifically illustrates a basic computing system 10. For purposes of this description and in the claims, a "computing system" may simply be a television set coupled with a processing device for performing the data processing steps disclosed herein, or can be as complex as desired, with any number of consumer electronic devices, one of which having a processing device for performing the data processing steps disclosed herein. For example, a computing system may include a television set that is coupled to a set-top box. Moreover, the term "computing system" is to be understood as a term that broadly describes a television-viewing environment.

In one embodiment, as shown in FIG. 1, computing system 10 includes display device 12 and speaker device 22. Display device 12 may be a standard television display, a flat panel display, a projection device, a high definition television display, a computer monitor, or any other device capable of displaying viewable video image data. Speaker device 22 may be a speaker, a stereo system, or any device capable of emitting video sound data. Speaker device 22 may be integrally positioned with respect to display device 12. For example, display device 12 may be a television monitor, and speaker device 22 may be a television speaker integrated with the television monitor.

While the present invention can be advantageously implemented in the environment illustrated in FIG. 1, those skilled in the art will appreciate that embodiments of the present invention can be practiced in any number of other system configurations, such as, by way of example, in combination with a VCR, a video game system, a stereo system, a television with data processing capabilities, a cable television box, DSS/DVB, DVD, a set-top box that serves as an Internet terminal, any other device capable of processing data as described herein, etc.

Referring to FIG. 1, computing system 10 further includes a means for receiving programming. In this description and in the claims, "programming" includes both the viewable portions of the moving image data and its associated sound data. By way of example, FIG. 1 depicts the transmission of programming to computing system 10 via programming input line 24, which could be a cable, an antenna system device, a satellite system device, or any device or system capable of transmitting programming to computing system 10. Computing system 10 may further include a means for receiving Internet line 26 for bi-directional data exchange over the Internet.

The means for receiving programming input line 24 and the means for receiving Internet line 26 are shown collectively and by way of example in FIG. 1 as management device 14. Management device 14 may be, for example, a set-top box that includes a connection for programming input line 24 in order to receive programming and a connection for Internet line 26 in order to send and receive data over the Internet. Management device 14 may be integrated with display device 12. Alternatively, the management device 14 may be separate from display device 12.

Computing system 10 also includes a means for receiving instructions from a viewer. FIG. 1 depicts such means for receiving instructions from a viewer as sensor 16, which receives viewer input from input device 18, which is a remote control, keyboard, microphone, or any other device capable of generating electronic instructions for control of management device 14. Input device 18 is communicatively coupled to management device 14 over input link 20 so as to enable such control. Input device 18 generates electronic instructions over input link 20 in response to preprogrammed data or in response to a viewer pressing buttons on input device 18, which may also control Web browser software within management system 14 as when management system 14 is a set-top box or an Internet terminal that has been adapted to perform the operations disclosed herein. By way of example, input device 18 may be programmed to turn on computing system 10 and to tune management device 14 to a channel.

A means for providing video image data from management device 14 to display device 12 is shown for example as video image link 28, which may be any link capable of providing video image data to display device 12 such as, a radio-frequency (RF) link, an S-video link, a composite link, or any other equivalent form of video image link.

A means for providing video sound data from management device 14 to speaker device 22 is shown for example as video sound link 30, which may be any link capable of providing video sound data to speaker device 22 such as a radio-frequency (RF) link, a wired link, or any other equivalent form of video sound link.

Figure 2:
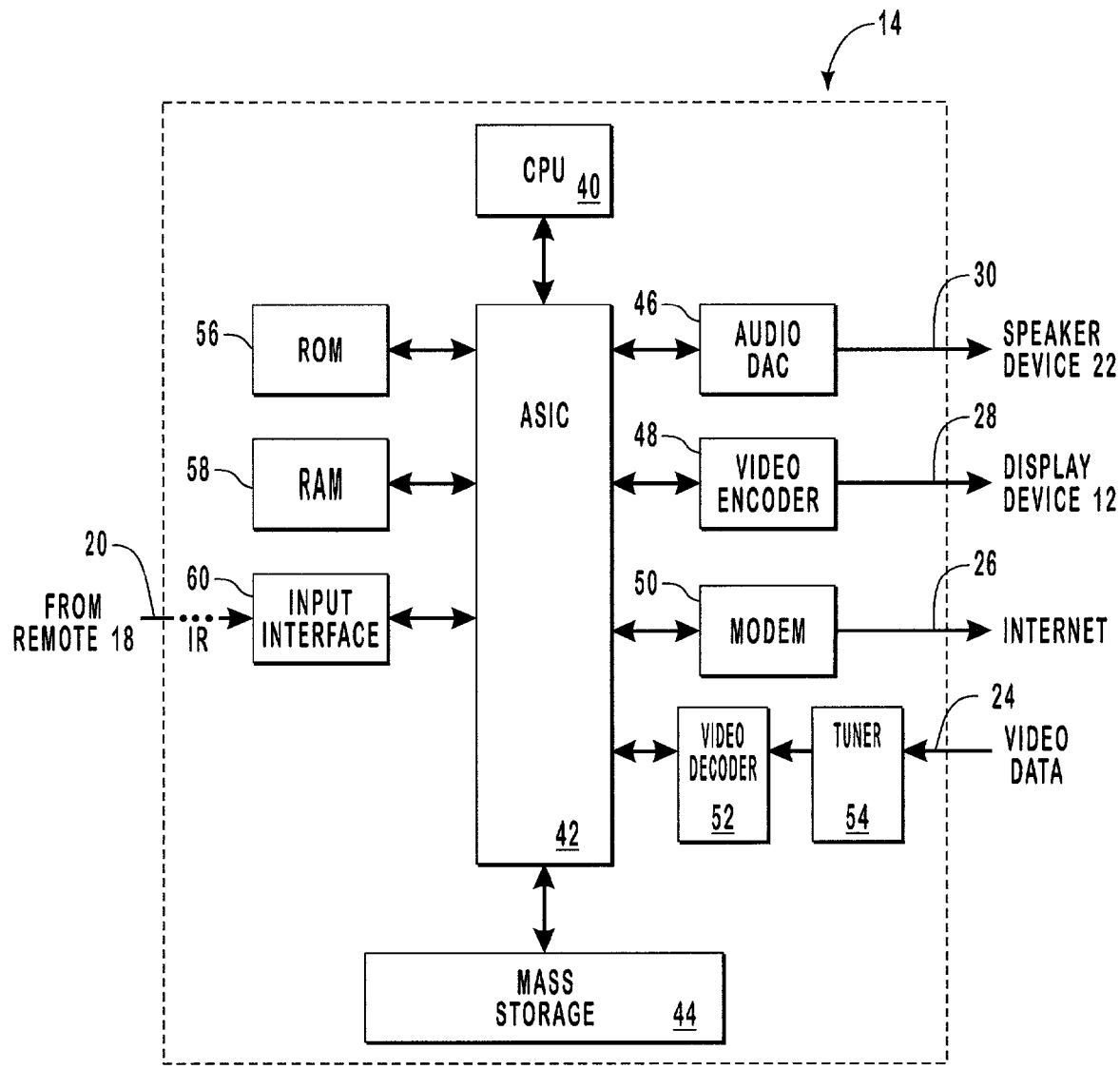
FIG. 2 is a schematic drawing of the management device of FIG. 1.

Referring to FIG. 2, a block diagram of the internal features of management device 14 is illustrated according to an embodiment of the present invention wherein management device 14 is a set-top box. The operation of management device 14 is controlled by Central Processing Unit (CPU) 40, which is coupled to an Application-Specific Integrated Circuit (ASIC) 42 and uses computer-executable instructions implemented in software and/or hardwired logic circuitry. CPU 40 executes software designed to implement features of management device 14 including features of the present invention. ASIC 42 contains circuitry that is used to implement certain functions of management device 14. Instructions, data, and other software necessary for the herein described operation of CPU 40 and ASIC 42 may be stored, for example, in read-only memory (ROM) 56, random-access memory (RAM) 58, and/or mass storage device 44, which may be any mass memory means capable of storing large amounts of data such as a magnetic or optical disk drive. ROM 56, RAM 58 and mass storage device 44 are communicatively coupled to ASIC 42 so as to be readable by ASIC 42 and so that data may be written from ASIC 42 to RAM 58 and possibly mass storage device 44. Program code means comprising one or more program modules may be stored on mass storage device 44, ROM 56, or RAM 58.

Management device 14 includes a means for providing video image data on video image link 28 to display device 12, and a means for providing video sound data on video sound link 30 to speaker device 22. If the video data on video input line 24 includes video data of multiple channels, the means for providing and recognizing the video data includes a means for tuning to a desired channel of the video data on video input line 24. The means for tuning is represented in FIG. 2 as tuner 54 and may include any device capable of tuning to a desired channel of a video signal.

In one embodiment tuner 54 is controlled by input device 18. Referring back to FIG. 1, input device 18 generates an electronic instruction to tune to a desired channel and transmits that electronic instruction over input link 20 to management device 14. Referring to FIG. 2, the electronic instruction is received by input interface 60 and provided to ASIC 42, which in turn transforms the electronic instruction, if necessary, to be recognizable by tuner 54. Video decoder 52 is used for converting video data from an analog format to a digital format, or from a digital format to an analog format, in the event that ASIC 42 and tuner 54 employ different formats. The electronic instruction is then transmitted to tuner 54. In the embodiment of FIG. 2, computing system 10 is associated with Internet line 26, which enables the computing system to receive the data that constitutes an electronic program guide that may be stored on mass storage device 44, as will be further explained below. In alternative embodiments, electronic program guide data can be delivered to the computing system using direct-dial communication over standard telephone lines or data transmission over the cable television infrastructure, a satellite network, over-the-air broadcasting or any other available medium.

Management device 14 is capable of transmitting information via Internet line 26, by direct-dial communication over standard telephone lines, or using any other available communication medium. The hardware and computer-executable instructions included in management device 14 (or any other electronic device in which the invention is implemented) represent an example of a means for transmitting information to a remote location. For example, the means for transmitting information can be any device that interfaces with the Internet, telephone lines, or another communication medium, such as a modem, a network interface card, etc.

Figure 3:
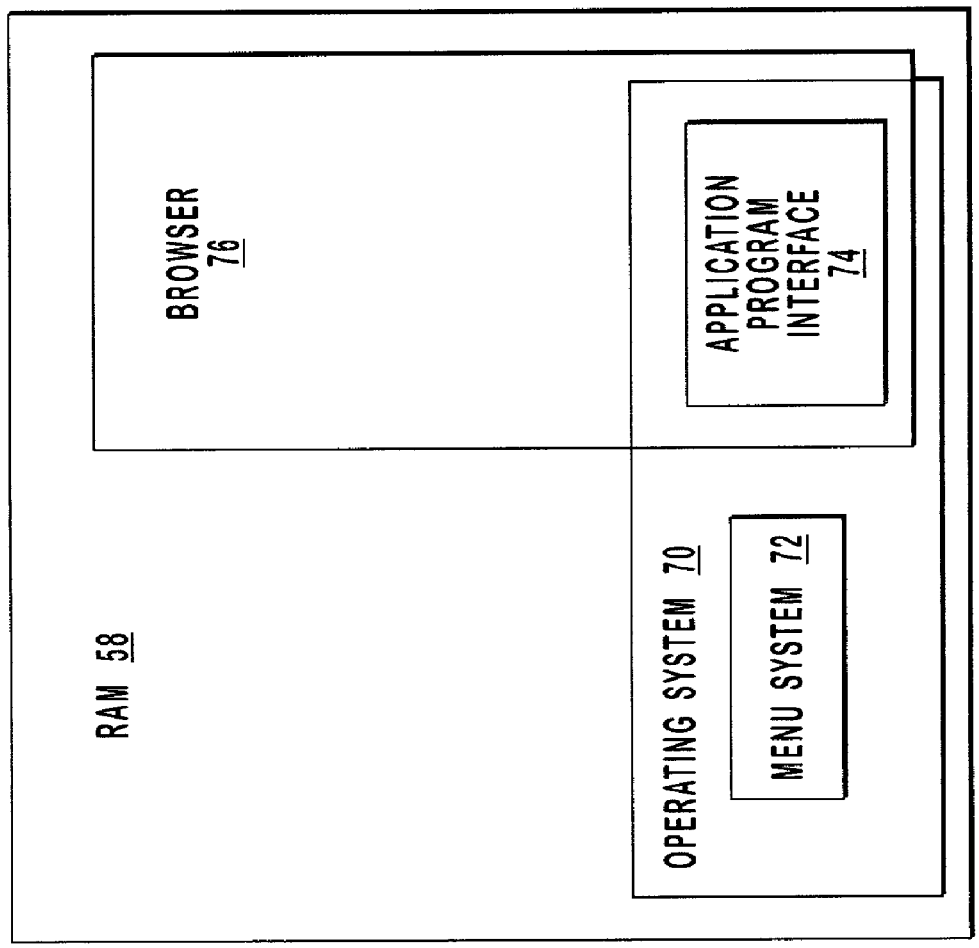
FIG. 3 is a block diagram that illustrates the interaction of software layers stored within a storage device.

Program code means comprising one or more program modules may be stored in a storage device, such as on mass storage device 44, ROM 56 or RAM 58. With reference to FIG. 3, a block diagram is provided that illustrates the interaction of program modules stored in a storage device, such as RAM 58 of FIG. 2. The program modules stored in RAM 58 include a browser 76, which is capable of displaying HyperText Markup Language ("HTML"), including television programming.

The program modules stored in RAM 58 also include a software protocol layer that is inserted into the browser to provide a user interface ("UI") platform for managing a variety of media, such as television programming, web pages, email accounts, etc. that may be displayed on a television screen or other display device. The UI platform allows for contextual and/or static options, which interface in a standardized way with the UI platform, to be available for selection by a user. Operating system 70 of FIG. 3 includes programmable code that, when implemented, provides a menu system 72 to be displayed on a display device.

Operating system 70 and browser 76 interact through application program interface 74, which is a language and message format used by browser 76 to communicate with operating system 70. Application program interface 74 is implemented by writing function calls in the program of browser 76 that provide a linkage to the required subroutine for execution. Through application program interface 74, browser 76 communicates with operating system 70 and parameters are defined that are passed between browser 76 and operating system 70. In one embodiment of the present invention application program interface includes one or more ActiveX© controls. As such, contextual and/or static options may interface in a standardized way with the operating system 70 by the use of an option/application to an API and communicating with the operating system in a standardized manner.

Dynamically Controlled User Interface

The present invention is directed to a ratcheting menu system that interfaces between a user and a variety of media displayable on a display device of a computing system and maximizes the viewable area on the display device. The ratcheting menu system removes the distinctions between different types of media by allowing the user to control a variety of media through one menu system, which, for example, allows access to television programming while providing authentication to maintain security on web pages, as will be further explained below.

Figure 4A:
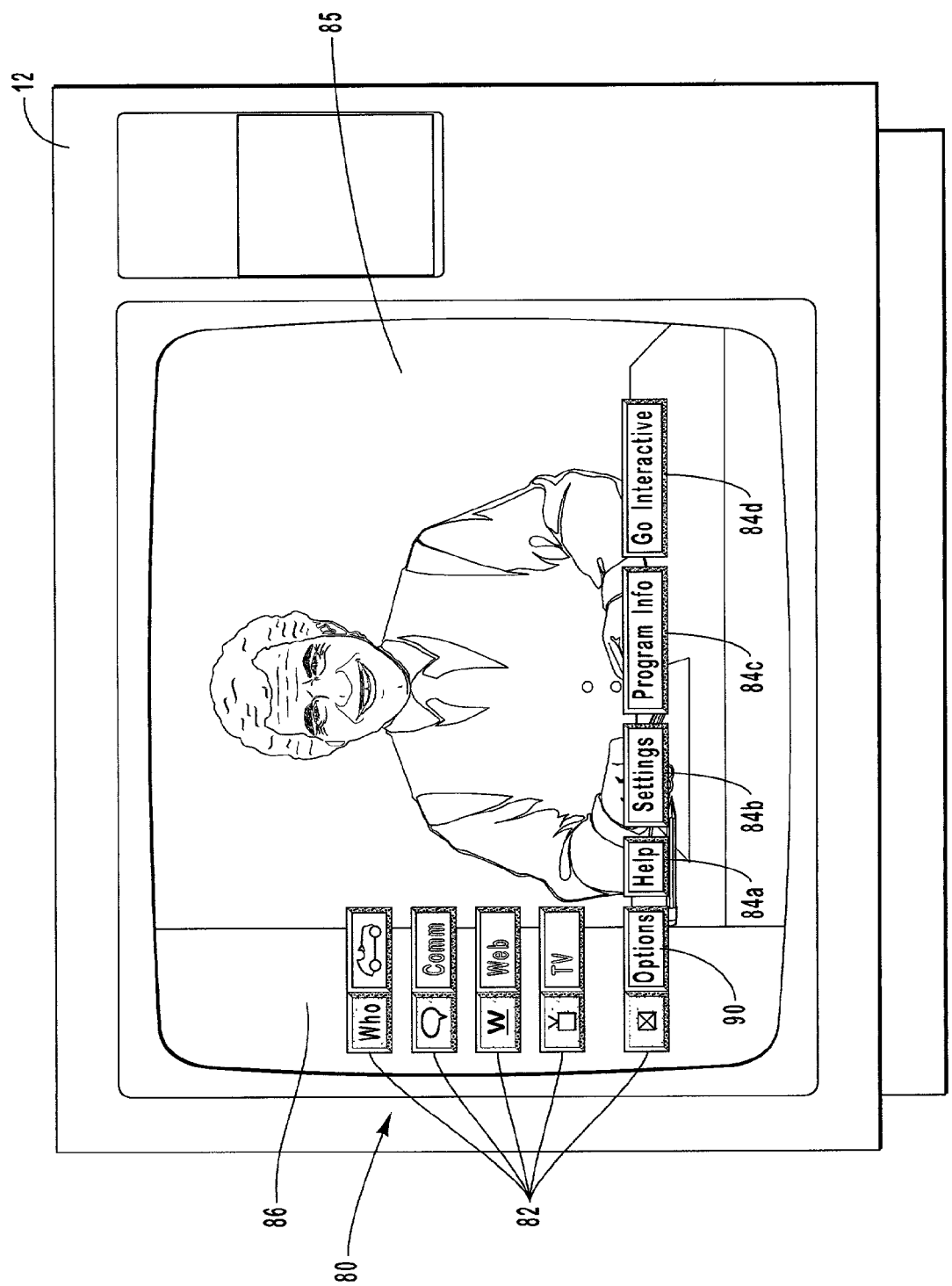
FIG. 4A illustrates an exemplary menu system, which minimizes the amount of programming that is blocked by the menu system, and includes categories and subcategories for displaying selectable options, functions or applications.

With reference to FIG. 4A, a ratcheting menu system is illustrated generally as menu system 80, and is displayed on a display device such as display device 12 of FIG. 1. The menu system allows for a variety of media platforms to be displayed, such as television programming 85, while the menu system is displayed. In one embodiment, the display screen is altered when the menu system is displayed, for example, by dimming the programming 85 and/or displaying a colored band 86 to provide a frame for the programming.

The menu system may be organized in a hierarchical or categorical order. In the illustrated embodiment, the menu system includes categories 82 and corresponding subcategories. One such category, illustrated as category 90, may provide various selectable options, illustrated as subcategories 84, which may include, for example, a Help button 84*a*, a Settings button 84*b*, a Program Information button 84*c*, and an Interactive button 84*d*. The Help button 84*a* provides general assistance on navigating the menu system. The Settings button 84*b* provides an option for modifying the display of display device 12 and may provide additional subcategories such as, by way of example, subcategories to control the hue, tint, color, brightness, etc. of the picture. The Program Information button 84*c* provides detailed information on the programming 85 currently displayed on display device 12.

The Interactive button 84*d* provides a static option in the form of a mini application that may be designed to bring functionality or information to the viewer without changing the content of the programming. Mini applications may be smaller versions of full screen counterparts, and may include an electronic program guide, a web search, a messenger, etc., as will be further detailed below. In one embodiment, when a user desires to use menu system 80, a button may be selected on a remote control to display menu system 80. Further, a default setting of the menu system may include displaying the categories 82 and the subcategories 84, which correspond to category 90.

Figure 4B:
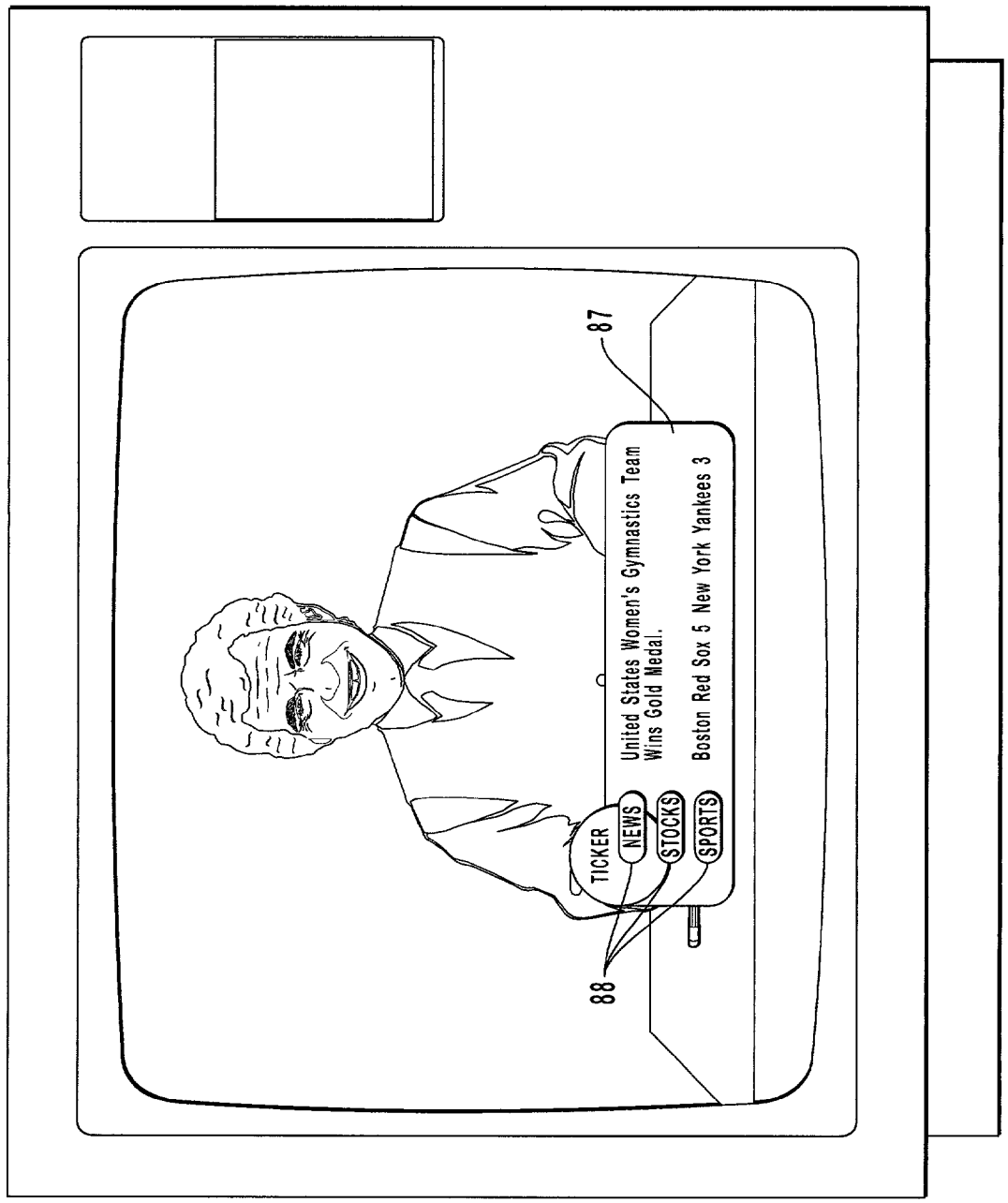
FIG. 4B illustrates an exemplary mini application as one of the selectable options of the menu system of FIG. 4A, wherein the mini application provides current information to a viewer.

Referring now to FIG. 4B, an example of a mini application is illustrated in response to a user selecting subcategory 84*d* of FIG. 4A. The mini application 87 of FIG. 4B provides current information to a viewer by allowing a viewer to select one of the various topic options 88 in order to control the type of scrolling information that is displayed, such as updating news information, stocks information, sporting information, etc. Mini application 87 allows a viewer to continue to watch programming or surf the Internet in the background while having access to information displayed and scrolled in the foreground of the display device.

Figure 5A:
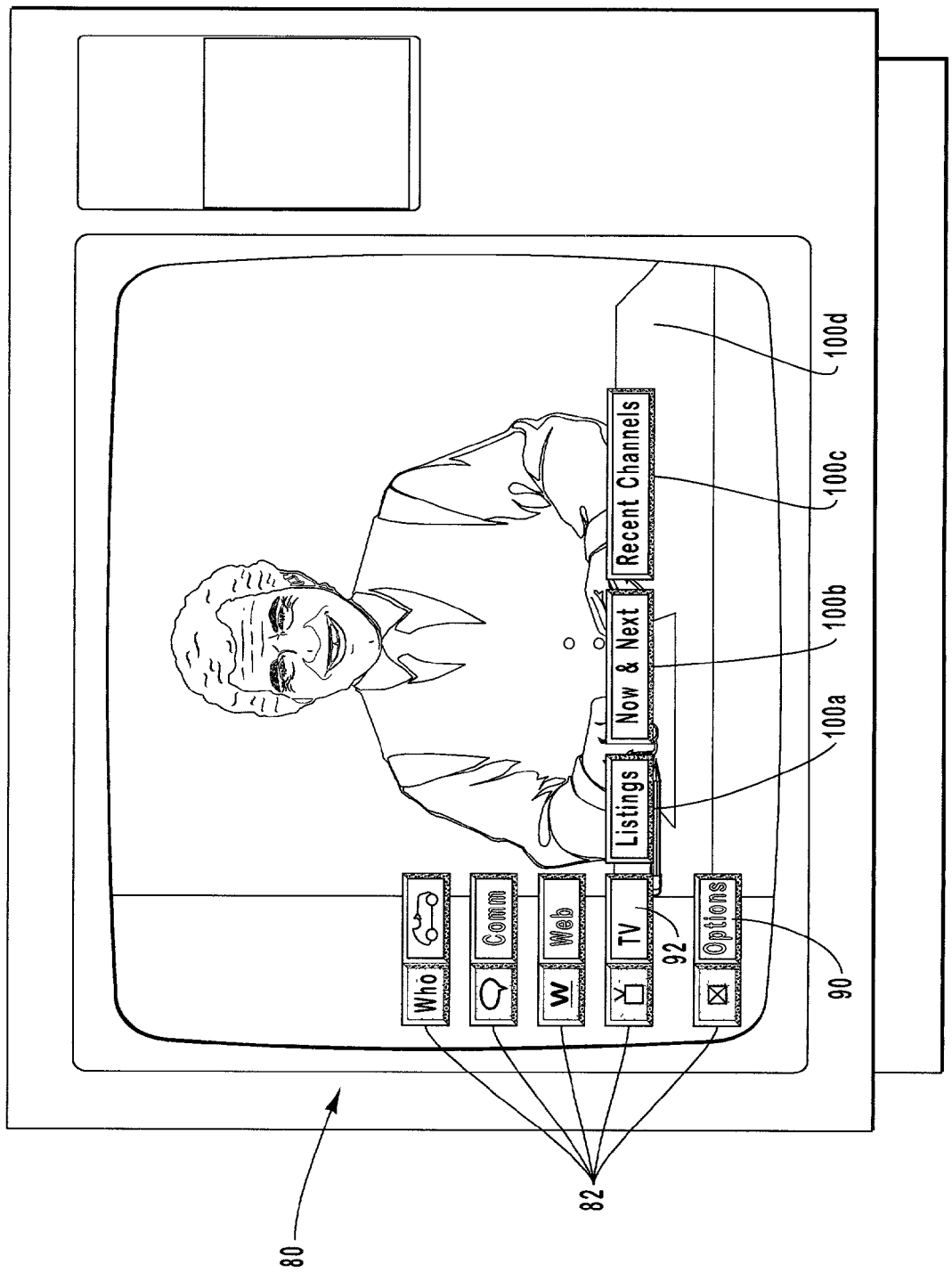
FIG. 5A illustrates an exemplary manner of ratcheting the individual categories of the menu system of FIG. 4A.

Referring now to FIG. 5A, when a user selects another category, such as category 92, the menu system 80 ratchets down so that each of the categories rotate down a position. As illustrated, subcategories 84 of FIG. 4A are no longer displayed. Rather, subcategories 100, which correspond to the selected category 92, are displayed in the same location or line where subcategories 84 of FIG. 4A were displayed. This location or line may be referred to as the selected position as it is used to display subcategories that correspond to a selected category.

Thus, menu system 80 allows a viewer to utilize an input device, such as a remote control device, to navigate through the menu system 80. In one embodiment, menu system 80 appears in the same format, such as the format illustrated in FIG. 4A, every time the viewer requests the menu system to be displayed. In one embodiment, upon selecting an "up" arrow on the remote control device, the subcategories of category 90 are no longer displayed and instead the subcategories of category 92 are displayed (illustrated as subcategories 100). In one embodiment, the displayed subcategories always remain in the same location on the screen of the display device. Therefore, when menu system 80 displays categories 82 and subcategories 84, as illustrated in FIG. 4A, and the user selects an "up" arrow in order to view subcategories 100, all of the categories 82 shift or ratchet down to allow subcategories 100 to appear at the same location vertically on the display device in which subcategories 84 were displayed. Therefore, the amount of viewable media (e.g. programming or web page) available in the background is maximized by minimizing the amount of the media that is blocked by menu system 80.

Figure 5B:
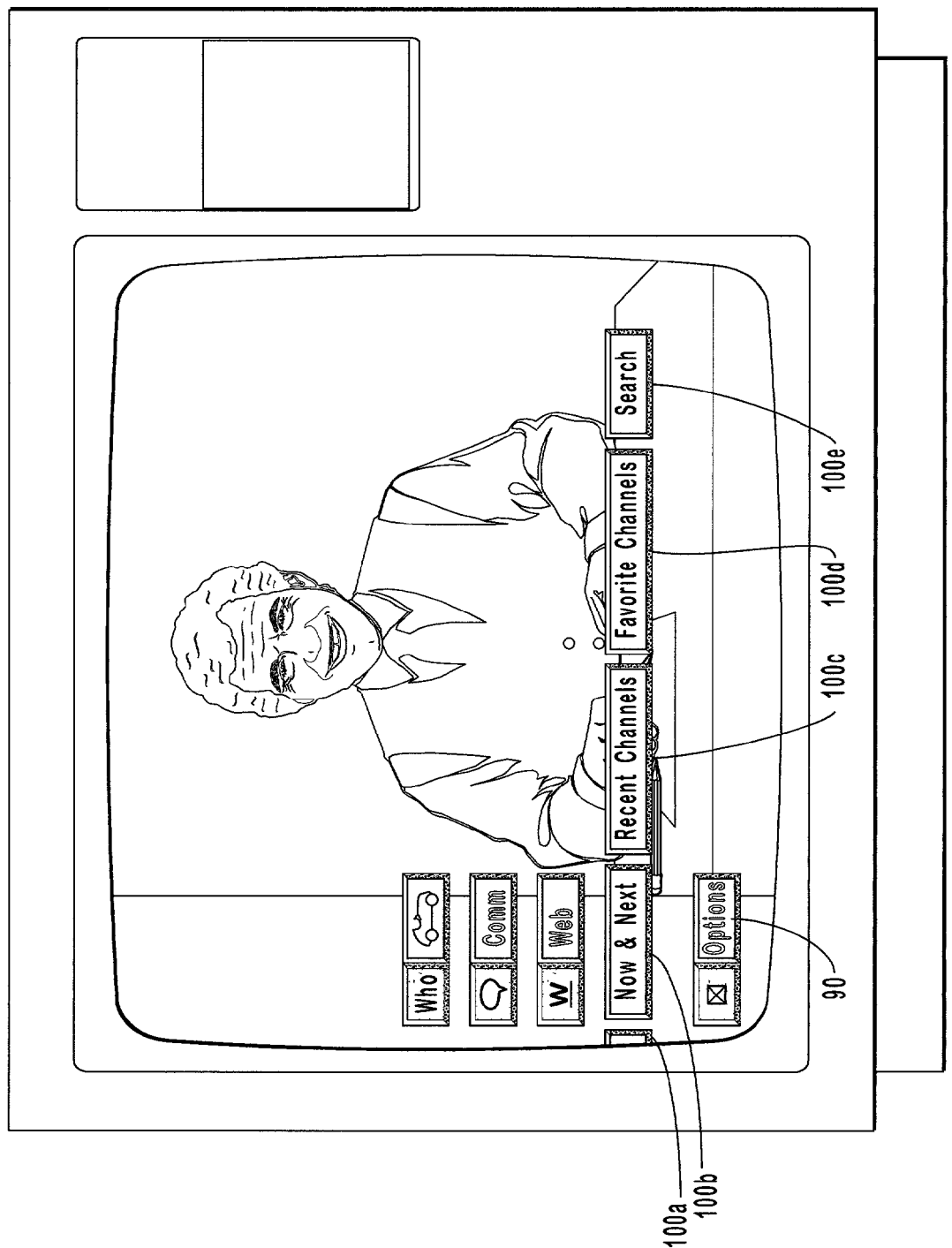
FIG. 5B illustrates an exemplary manner of displaying a variety of subcategories that correspond to a selected category.

Referring back to FIG. 5A, subcategories 100 correspond to category 92, which relate to television programming. Subcategories 100 may include a Listings option, a Now and Next option, a Recent Channels option, a Favorite Channels option, and a search option. When subcategories 100 include a large number of options such that the options are unable to be viewed on the display device at one time, one embodiment of the present invention allows a user select a "right" arrow in order to scroll through the options of subcategories 100 without having the subcategories move vertically on the screen, as displayed in combination between FIGS. 5A and 5B.

Figure 5C:
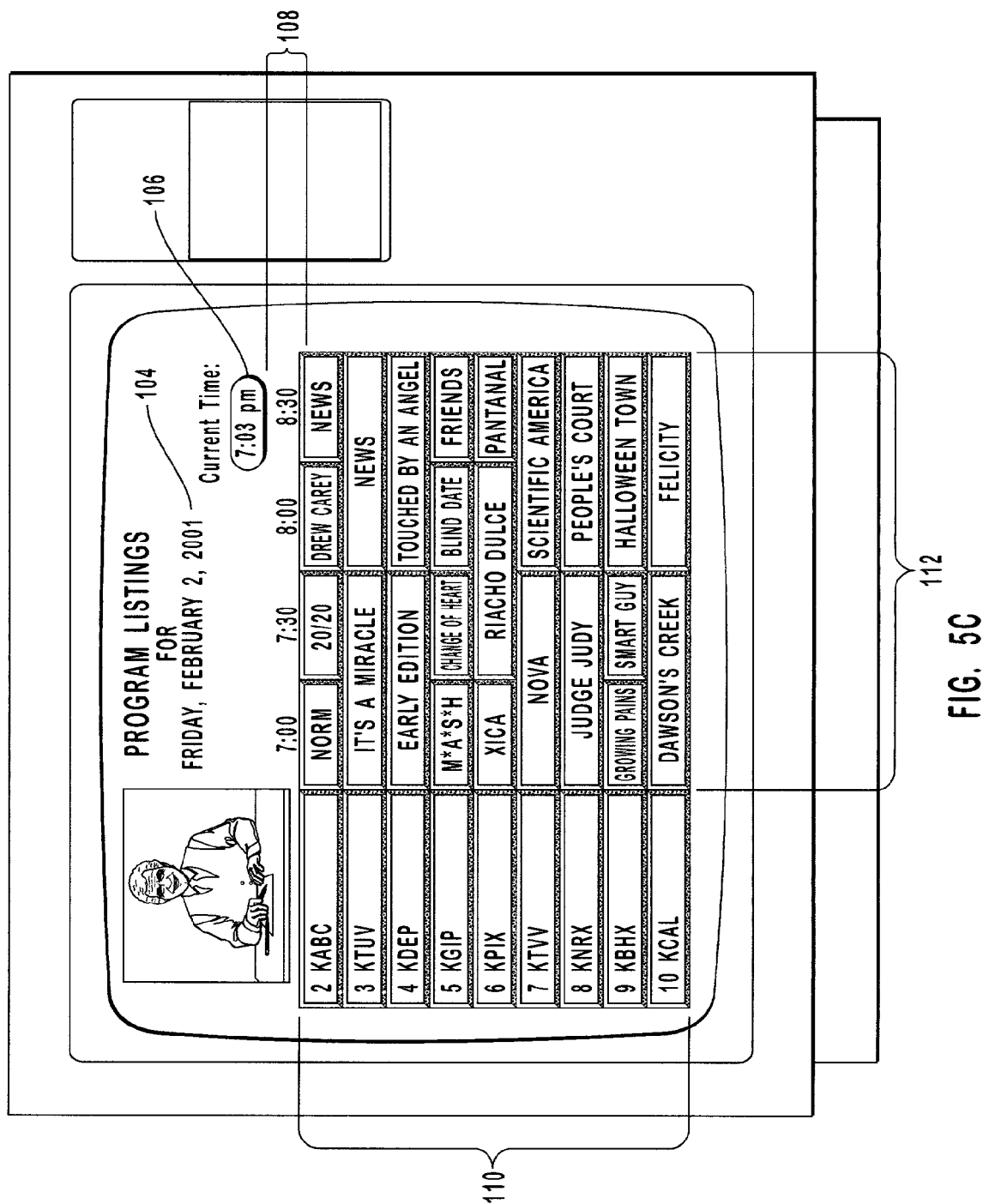
FIG. 5C illustrates an exemplary mini application as one of the selectable options of the menu system of FIG. 4A, wherein the mini application provides a listing of scheduled programming.

As provided above, subcategories 100 may include a Listings option. The Listings option provides a detailed table, or electronic program guide, to the viewer of the various scheduled programs on each of the channels available to the viewer. By way of example, FIG. 5C provides an exemplary program listing, which provides the current date 104, the current time 106, the scheduled time for each program 108, the channel 110 upon which each program will be aired, and the title 112 of each program.

In one embodiment, when a viewer selects the listings option, the displayed programming is placed in a small frame so that the viewer can continue to watch the programming while simultaneously having the program listing available to the viewer. The viewer may then scroll through the program listing using an input device, such as a remote control device, and may also scroll through the channels 110, scheduled programming times 108, dates 104, etc.

In a further embodiment the viewer may select a button on the remote control device that allows a search window to appear on the display device in order for the viewer to enter in a desired program title and upon selecting a search button the details of the desired program are displayed on the display device to indicate to the viewer such information as when the program will be aired and on what channel, as will be further explained below.

Figure 5D:
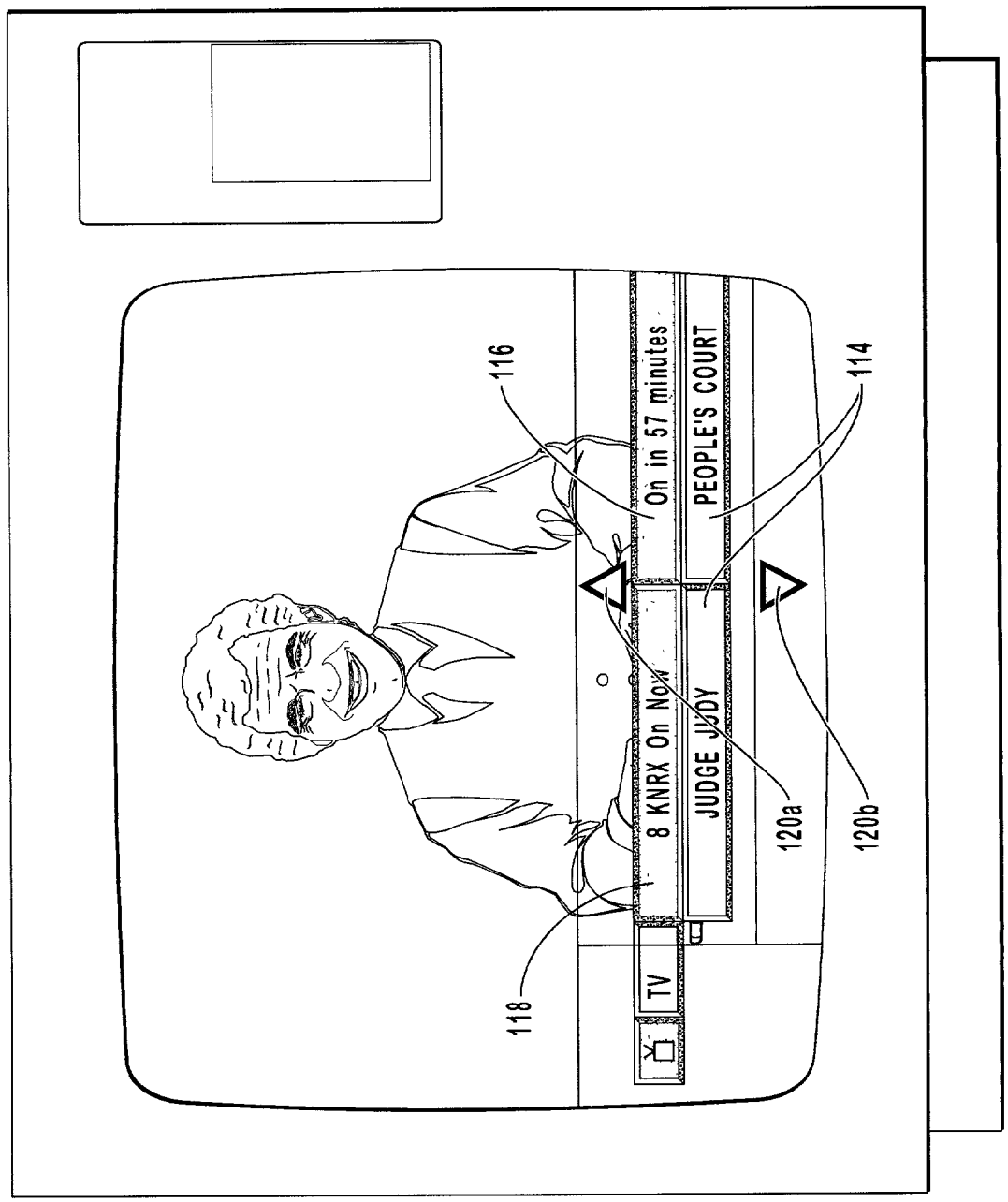
FIG. 5D illustrates an exemplary mini application as one of the selectable options of the menu system of FIG. 4A, wherein the mini application provides a condensed listing of available programming.

Another option available among options 100 may include a Now and Next option. This option allows for a viewer to scroll through a scheduled programming listing using a smaller listings menu, as illustrated in FIG. 5D. The smaller listings menu allows for the programming to continue to be aired in the background using the full screen of the display device, and provides, for example, a specific channel 118, the titles 114 of the current program on aired on the channel and the next program scheduled to be aired on the channel, and the time 116 when the next program will be aired. Navigational buttons 120 correspond to an "up" arrow or alternatively a "down" arrow on the remote control device in order to allow the user to scroll through the various channels so that the viewer can quickly see the name of the current program being aired on a specific channel and the title of the subsequent program that will be aired on that same channel and when it will be aired. In another embodiment, the user may scroll to the right to view other programs scheduled to air on the channel.

Figure 5E:
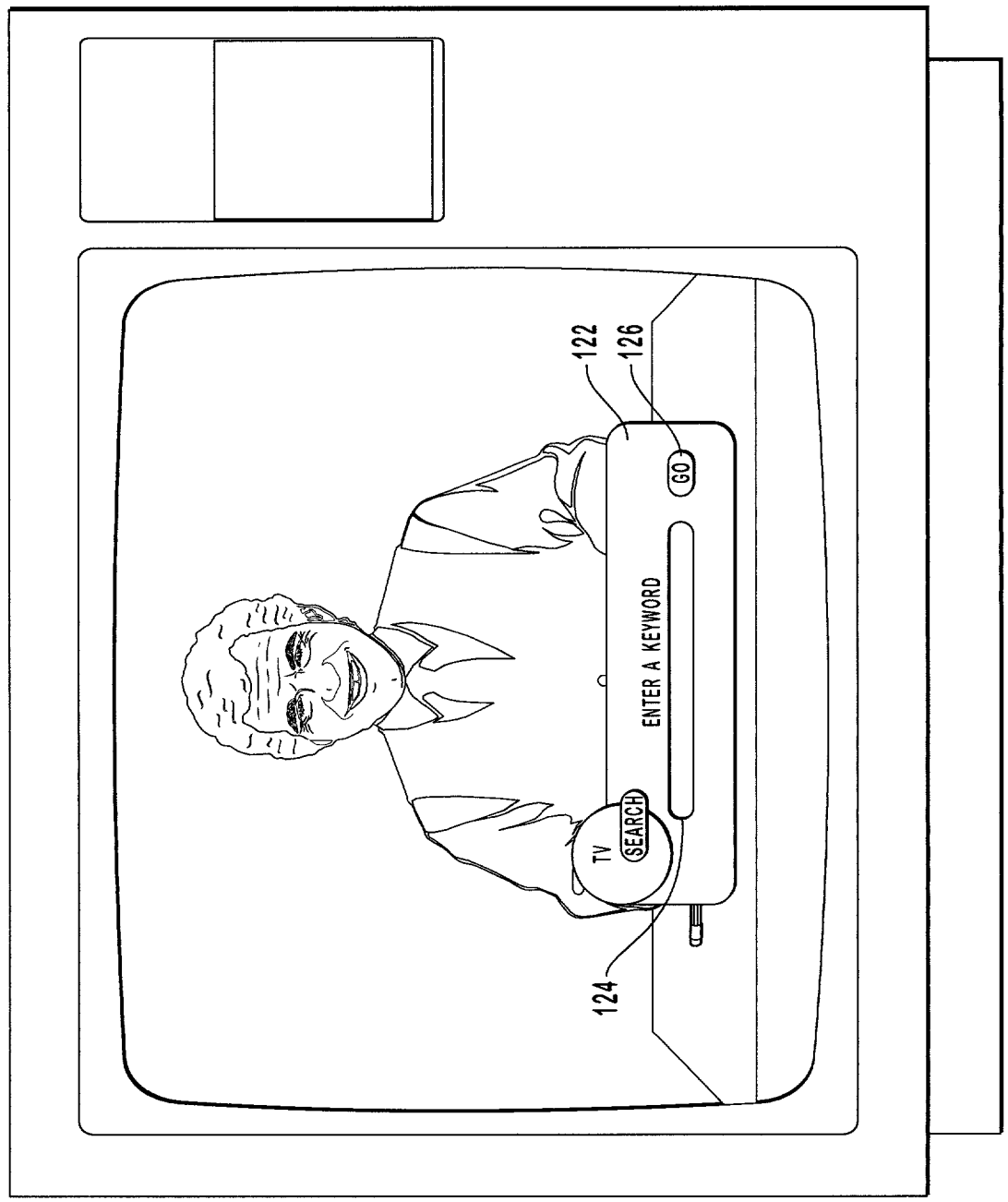
FIG. 5E illustrates an exemplary mini application as one of the selectable options of the menu system of FIG. 4A, wherein the mini application provides a location for a viewer to input information and perform a search directed to the input information.

Referring now to FIG. 5E, an exemplary mini application is illustrated as one of the selectable options of the menu system of FIG. 4A where the mini application provides a location for a viewer to input information and perform a search directed to the input information. In FIG. 5E, a search option is available to the viewer that includes a location for inputting words and/or symbols to be searched at location 124 and a selectable button 126 to execute the search. As provided above, one such search includes inputting the title of a program that scheduled to air. The results of this search displays details on the program, such as when the program begins, the channel on which the program will be aired, the ratings of the program, etc.

Figure 6A:
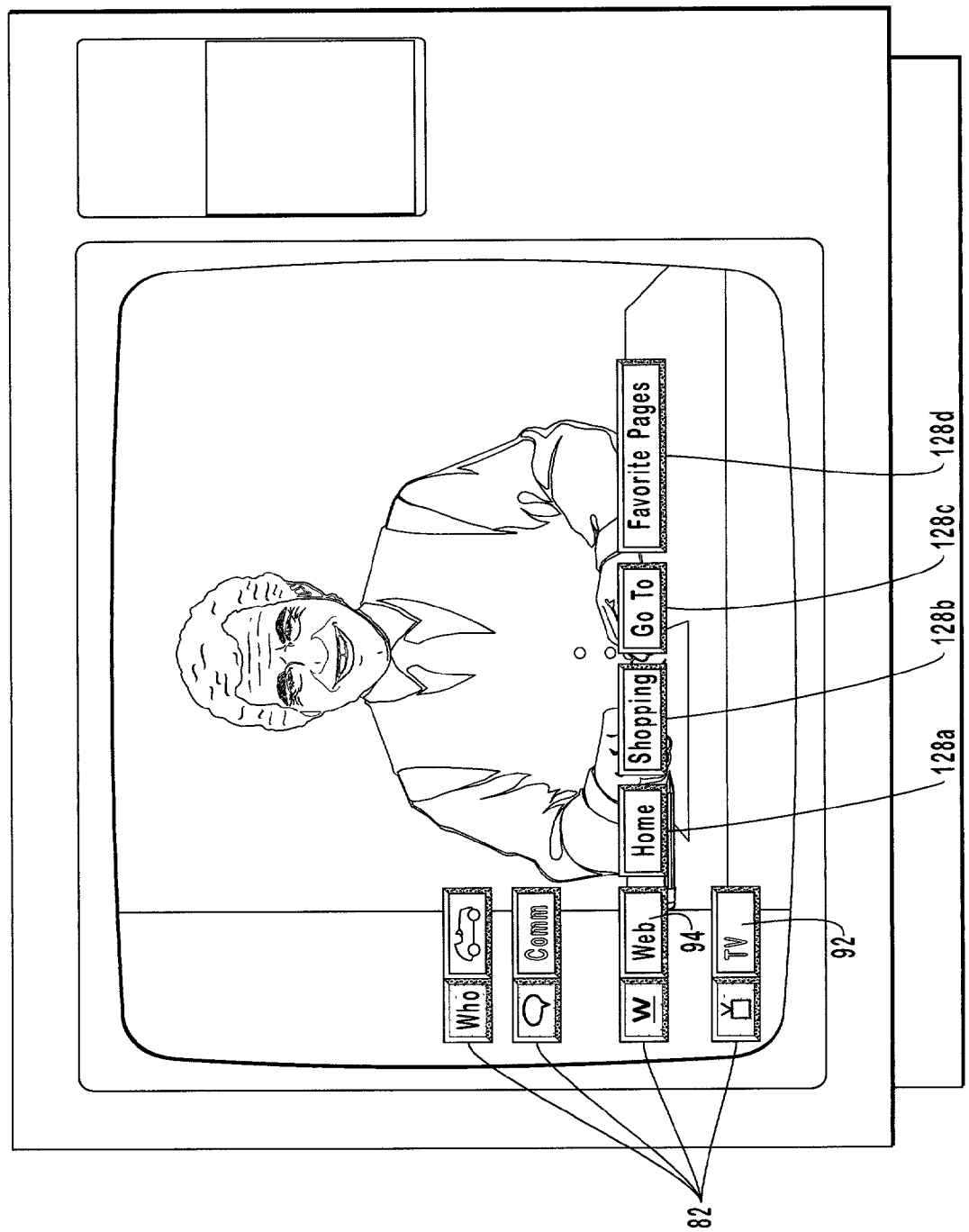
FIG. 6A further illustrates the ratcheting of the menu system of FIG. 4A and illustrates the use of the menu system across a variety of media platforms, including television programming.
Figure 6B:
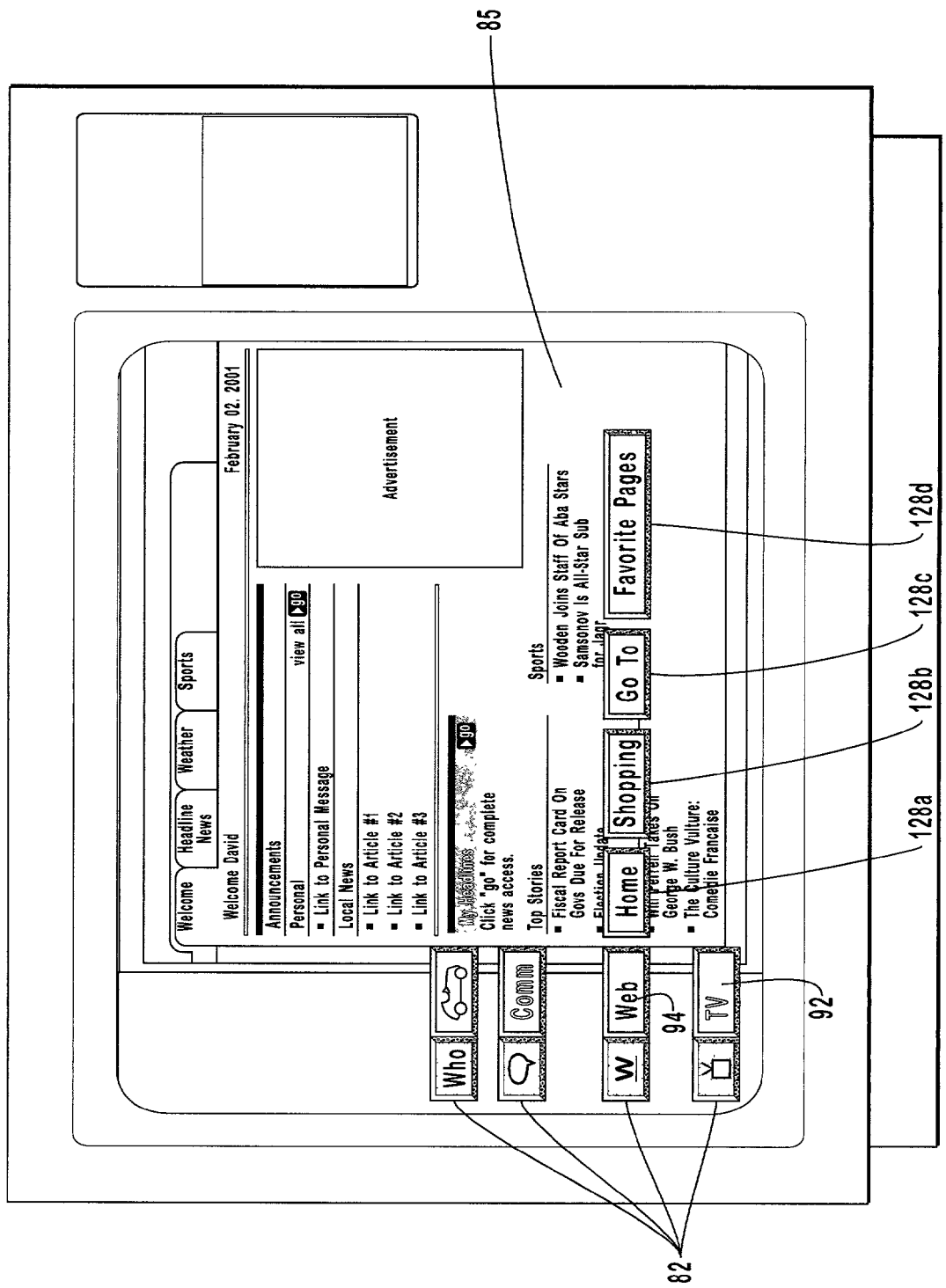
FIG. 6B further illustrates the use of the exemplary menu system of FIG. 4A across a variety of media platforms, including an Internet web page.

Referring now to FIG. 6A, upon a viewer selecting an "up" arrow on a remote control device, the menu system categories 82 shift or ratchet down, and subcategories 128 corresponding to selected or highlighted category 94 are displayed to the viewer. In the embodiment illustrated in FIG. 6A, category 94 relates to the Internet. Subcategories 128 include a Home option, a Shopping option, a "Go To" option, and a Favorite Pages option. By selecting the Home option, a specific web page, designated as the viewer's home page, is displayed in the background of the display device, as illustrated in FIG. 6b. Thus, as illustrated by FIGS. 6A and 6B, the ratcheting menu system may be used to display and/or control different types of media. Furthermore, the menu system allows for the toggling or displaying back and forth of different types of media, such as television programming and Internet web pages.

Referring back to FIG. 6A, the "Go To" option allows for a viewer to have a desired web page displayed on the display device. It allows, for example, a user to enter a Uniform Resource Locator ("URL") so as to display the corresponding web page. The Favorite Pages option displays a listing of favorite web pages as designed by the viewer.

The Shopping option allows for a user to make purchases through the use of the Internet. In one embodiment a viewer may be watching programming on the display device and upon viewing an advertisement may select the shopping option in order to purchase the item advertised. Therefore, when an advertisement is displayed to a viewer to allow the viewer to purchase, for a limited time, a large two topping pizza for $5.00, the viewer may select the shopping subcategory 128b, input purchase information such as a credit card number, an electronic account number, or the like, to cause the viewer to purchase the pizza at the sale price and have it delivered to the viewer's residence. In one embodiment, the residence and/or purchase information may be available through a user profile and is automatically sent by the system upon the viewer indicating a desire to purchase the advertised item. In another embodiment, authentication occurs to enable the purchase of the advertised item by sending to a set top box limited data, such as, the name of the user(s), the password(s), and whether the current user is a subscriber. The data is then downloaded from a server as an extensible markup language ("XML") file to the set top box, which acts as a client. The server instructs the client to refresh its data via a header, which contains the Uniform Resource Locator ("URL") for the XML file.

An electronic purchase is one example of how operating system 70, menu system 72, and browser system 76 can communicate one with another using an API 74, illustrated in FIG. 3, in a flexible manner that allows the ratcheting menu system to provide a wide variety of functionality to the viewer. For example, when a viewer makes an electronic purchase, browser 76 executes software that permits the viewer to initiate the purchase and communicates with operating system 70 and menu system 72 using API 74 to authenticate the identity of the viewer, obtain a credit card number, or obtain other information that facilitates the purchase. The architecture of FIG. 3 establishes a standardized way for software modules at the browser layer 76 to request information from operating system 70 and menu system 72, and eliminates the need for developers of software modules that operate at browser layer 76, such as the pizza purchase software of this example, to understand the details of how the operating system 70 and menu system 72 store and communicate information to the browser.

Figure 7A:
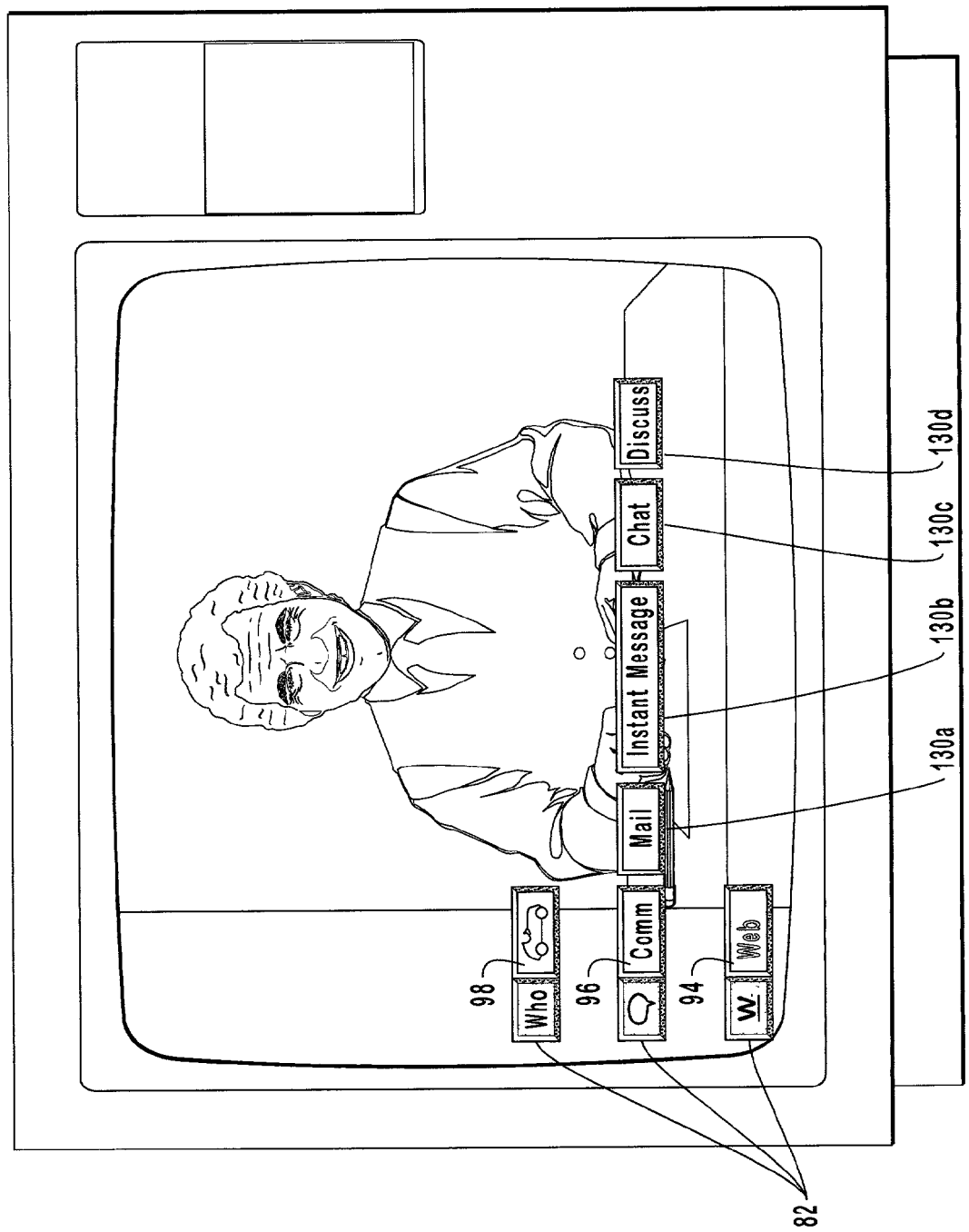
FIG. 7A further illustrates the use of the menu system of FIG. 4A across a variety of media platforms, including allowing a viewer to electronically communicate with one or more users.
Figure 7B:
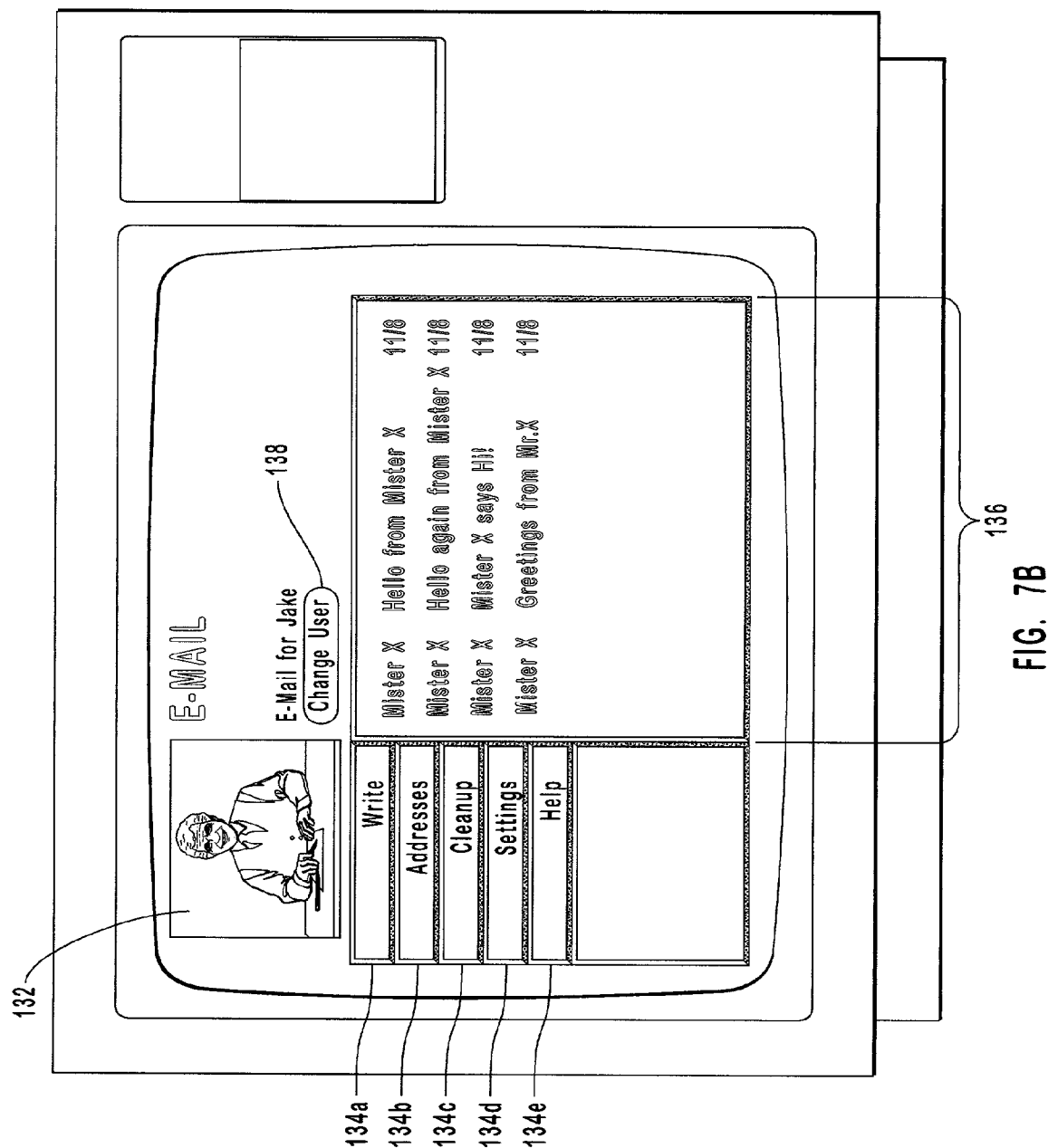
FIG. 7B illustrates an exemplary mini application as one of the selectable options of the menu system of FIG. 4A, wherein the mini application provides access to an electronic mail account.

Referring now to FIG. 7A, upon selecting the "up" arrow, categories 82 shift or ratchet down in order for subcategories 130, which correspond to category 96, to be displayed. In FIG. 7A, category 96 corresponds to a communication system and subcategories 130 include, for example, a Mail option 130a, an Instant Message option 130b, a Chat option 130c, and a Discuss option 130d. The mail option 130a allows a viewer to access the viewer's email account, read email, send email, etc. When a viewer selects the Mail option of subcategories 130, the email account for the viewer is displayed, as illustrated in FIG. 7B. Displaying the email account may include placing the current programming in a small box 132 on the display device and displaying email options 134 along with a listing of the email messages 136.

The email options include, by way of example, a Write option 134a, an Address option 134b, a Cleanup option 134c, a Settings option 134d, and a Help option 134e. The Write option 134a enables a user to compose an email message. The Address option 134b allows a user to access a list of email addresses in order to look up one or more email addresses from the list. The Cleanup option 134c provides a user with tools for organizing the email messages in the user's account. The tools include deleting a message, creating a subdirectory for storing messages, etc. The Settings option 134d provides a user with tools for formatting the overall look of the email account, blocking messages from specified email addresses, automatically deleting messages according to the content of the message, etc. The help menu 134e provides assistance to a user that desires to know how to perform one or more functions that are related to the email account. In one embodiment, the displaying of an email account includes providing a Change User option 138, which allows for the system to display a different email account.

Referring back to FIG. 7A, and as indicated above, subcategories 130 may include an Instant Message option 130b, a Chat option 130c, and a Discuss option 130d. The Instant Message option 130b, for example, allows a viewer to send or receive messages that pop up on display devices. The Chat option 130c allows the viewer to engage in a conversation with one or more other viewers at other computing systems while having the programming displayed. The Discuss option 130d allows a viewer to place one or more messages on a message board on the Internet or on another network.

Figure 8:
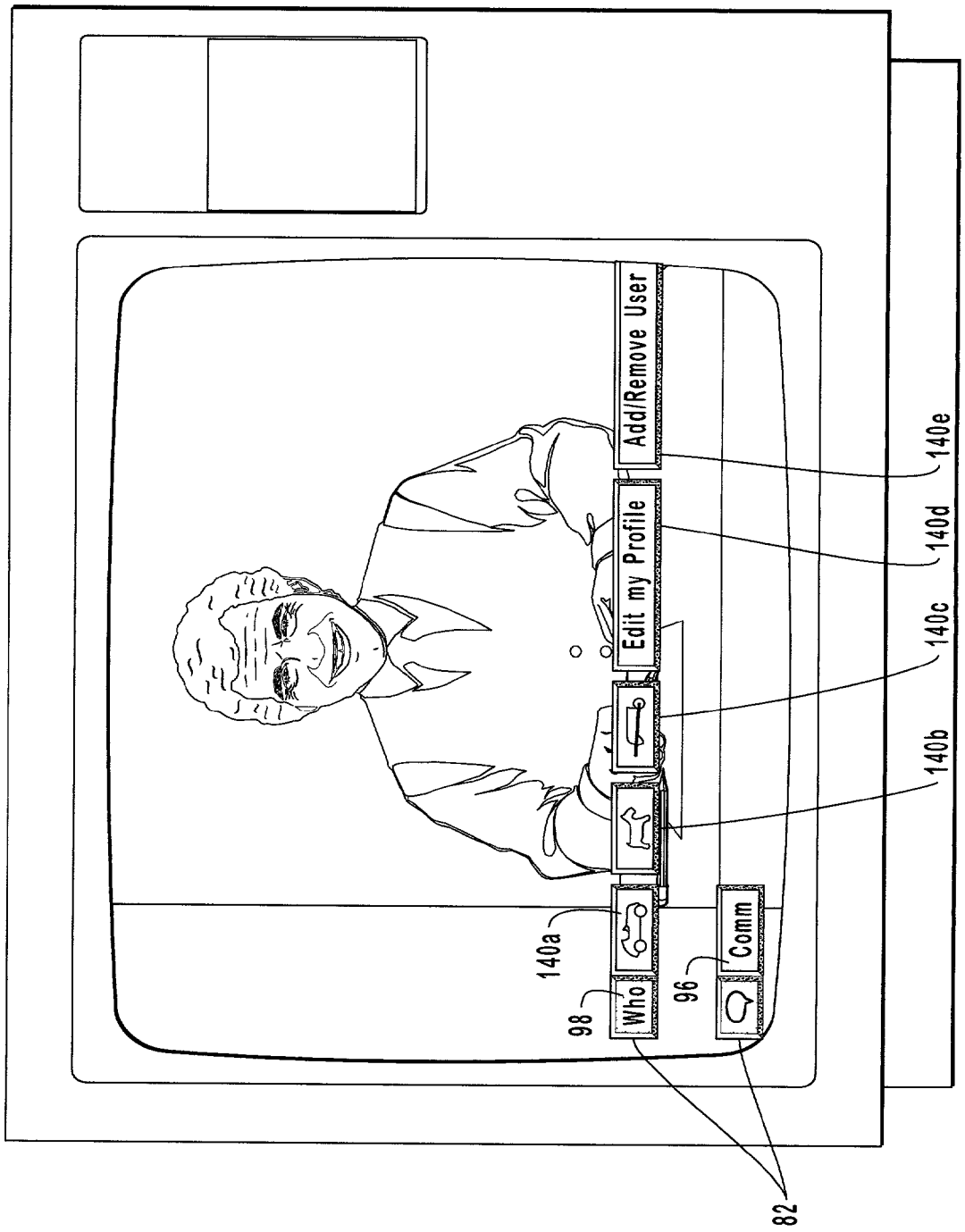
FIG. 8 further illustrates the ratcheting of the menu system of FIG. 4A and provides an exemplary manner for identifying a particular viewer.

Upon selecting the "up" arrow, the categories 82 shift or ratchet down in order to display the subcategories 140, as illustrated in FIG. 8. Subcategories 140 correspond to category 98, which relates to the various user accounts. Subcategories 140a, 140b and 140c each represent a viewer of the system and may indicate which viewer they represent either by the viewer's name (not shown) or by a symbol that corresponds to the viewer. Upon selection of one of the options 140a, 140b or 140c, the profile of the corresponding viewer is displayed. In one embodiment, the selection of a viewer option requires the input of a password in order to verify the identity of the viewer. Other options among subcategories 140 may include an option to edit a user profile, illustrated as subcategory 140d, and an option to add or remove the user profile, illustrated as subcategory 140e.

Therefore, as provided above, the present invention relates to systems and methods for providing a dynamically controllable user interface that embraces a variety of media. More specifically, the present invention is directed to a ratcheting menu system that interfaces between a user and a variety of media displayable on a display device and that maximizes the viewable area on the display device. A protocol layer provides a systematic manner for programmers to create other contextual and static options available to a user that may interface in a standardized way, rather than requiring each programmer to invent his/her own way of obtaining relevant information. The application is written to an API and communicates with the operating system in a standardized manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computing system that includes a display screen that is capable of displaying a variety of types of media, a method for providing a dynamically controllable user interface that embraces the variety of types of media, the method comprising the acts of:
   displaying a menu system on the display screen, wherein the menu system includes first and second categories selectable by a viewer, each of the first and second categories having corresponding subcategories;
   displaying the first category at a selected location of the display screen;
   in response to receiving a selection of the second category by the viewer, automatically replacing the first category with the second category at the selected position of the display screen, and such that each displayed category that is selected is ratcheted to the selected position; and
   displaying, with the second category, the subcategories corresponding to the second category in a single horizontal line, such that all of the subcategories corresponding to the second category can be accessed by horizontal scrolling of the menu system and without requiring any vertical scrolling of the menu system, and wherein the only subcategories displayed on the display screen at a given instant in time are the one or more subcategories corresponding to a category displayed at the selected position on the display screen at the given instant in time, and wherein every subcategory corresponding to each of the displayed categories, is only ever displayed at any time for selection on the display screen in the single horizontal line, regardless of which category is selected, and wherein each of the subcategories corresponding to a selected category is accessible without requiring any displayed subcategory of the selected category to move vertically and such that any undisplayed subcategory corresponding to the selected category is accessible during navigation of the subcategories through horizontal navigation, and without any vertical movement of the displayed subcategories corresponding to the selected category.

2. A method as recited in claim 1, wherein the act of displaying the first category is performed by a preset, default setting.

3. A method as recited in claim 1, wherein the act of displaying the first category is performed upon receipt of a first input command, wherein the first input command is received prior to the input command corresponding to the selection of the second category by the viewer.

4. A method as recited in claim 1, wherein the act of displaying a menu system includes displaying the first and second categories in a hierarchical order.

5. A method as recited in claim 1, wherein the first category corresponds to a first type of media and the second category corresponds to a second type of media, and wherein the first type of media is different from the second type of media.

6. A method as recited in claim 5, wherein the first type of media includes television programming, and wherein the second type of media includes a web page.

7. A method as recited in claim 1, wherein the act of displaying the first category includes displaying one or more subcategories corresponding to the first category.

8. A method as recited in claim 7, wherein the first category corresponds to a first type of media.

9. A method as recited in claim 8, wherein one of the one or more subcategories corresponding to the first category includes a selectable option that performs a function specific to the first type of media.

10. A method as recited in claim 8, wherein one of the one or more subcategories corresponding to the first category includes a selectable option that initiates an application corresponding to a third type of media.

11. A method as recited in claim 8, further comprising the act of displaying the first type of media in a background display of the display screen while the menu system is displayed in a foreground display of the display screen and the selected position remains constant, and such that the menu system overlays at least a portion of the first type of media being displayed in the background display.

12. A method as recited in claim 7, wherein the act of automatically replacing includes replacing a display of the one or more subcategories corresponding to the first category with a display of one or more subcategories corresponding to the second category within the selected position.

13. A method as recited in claim 12, wherein the second category corresponds to a second type of media.

14. A method as recited in claim 13, wherein one of the one or more subcategories corresponding to the second category includes a selectable option that performs a function specific to the second type of media.

15. A method as recited in claim 13, wherein one of the one or more subcategories corresponding to the second category includes a selectable option that initiates an application corresponding to a third type of media.

16. A method as recited in claim 13, further comprising the act of displaying the second type of media in a background display of the display screen while the menu system is displayed in a foreground display of the display screen and the selected position remains constant.

17. A dynamically controllable menu system for use with a display screen that provides options selectable by a user to perform one or more functions on a variety of different types of media, the menu system comprising:
   a plurality of categories displayed on the display screen, wherein the categories are capable of ratcheting such that any category from the plurality of categories that is selected by a user is automatically displayed at a selected location on the display screen, in response to being selected, while having the selected position remain constant, and such that every displayed category that is selected is ratcheted to the selected position; and
   a plurality of subcategories corresponding to the plurality of categories, wherein the only subcategories displayed on the display screen at a given instant in time are the one or more subcategories corresponding to the selected category displayed at the selected position on the display screen at the given instant in time, and wherein all of the one or more subcategories corresponding to the selected category are displayed within a single horizontal line, such that all of the subcategories corresponding to the selected category can be accessed by horizontal scrolling of the menu system and without requiring any vertical scrolling of the menu system, and wherein every subcategory corresponding to each of the displayed categories, is only ever displayed at any time for selection on the display screen in the single horizontal line, regardless of which category is selected, and wherein each of the subcategories corresponding to a selected category is accessible without requiring any displayed subcategory of the selected category to move vertically and such that any undisplayed subcategory corresponding of the selected category is accessible during navigation of the subcategories through horizontal navigation, and without any vertical movement of the displayed subcategories corresponding to the selected category.

18. A menu system as recited in claim 17, wherein the plurality of categories includes a first category specific to programming, a second category specific to the Internet, and a third category specific to electronic communication.

19. A menu system as recited in claim 18, wherein the subcategories corresponding to the first, second and third categories respectively allow a user to launch a function to modify a display of programming, modify a display of a web page, and participate in electronic communication.

20. A menu system as recited in claim 19, wherein subcategories corresponding to the third category allows a user to participate in electronic communication while at least one of programming or a web page is displayed on the display screen.

21. A menu system as recited in claim 17, wherein at least one of the subcategories launches an application that provides current information on a selectable topic.

22. A menu system for use in a computing system that includes a variety of options available to a user for controlling a variety of media, the menu system comprising:
   a contextual option, which upon selection, controls an aspect of media displayed on a display device; and
   a static option, which upon selection, executes a mini application while displaying the media on the display device, wherein the contextual option and the static option are organized in a categorical order that includes a plurality of categories, each of the categories having corresponding subcategories, wherein each of the displayed plurality of categories that is selected by the user is automatically displayed at a selected position on the display screen, in response to being selected by a user, and such that a category that is not displayed at the selected position automatically replaces a category that is being displayed at the selected position in response to being selected,
   wherein all subcategories corresponding to the selected category are displayed within a single horizontal line on the display screen, such that all of the subcategories corresponding to the selected category can be accessed by horizontal scrolling of the menu system and without requiring any vertical scrolling of the menu system, and wherein the only subcategories displayed on the display screen at a given instant in time are the one or more subcategories corresponding to a category displayed at the selected position on the display screen at the given instant in time, and wherein every subcategory corresponding to each of the displayed categories, is only ever displayed at any time for selection on the display screen in the single horizontal line, regardless of which category is selected, and wherein each of the subcategories corresponding to a selected category is accessible without requiring any displayed subcategory of the selected category to move vertically and such that any undisplayed subcategory corresponding to the selected category is accessible during navigation of the subcategories through horizontal navigation, and without any vertical movement of the displayed subcategories corresponding to the selected category.

23. A menu system as recited in claim 22, wherein subcategories correspond to the categories, and wherein the subcategories are selectable to a user to independently perform functions on a variety of different types of media.

24. A menu system as recited in claim 23, wherein the variety of different types of media includes programming, web pages, and electronic communication.

25. A menu system as recited in claim 23, wherein the categories are displayed in a foreground display on a display screen and at least one type of the media is displayed in a background display of the display screen.

26. A computer program product for implementing within a computing system a method for providing a ratcheting menu system on a display screen that interfaces between a user and a variety of media, the computer program product comprising:
   a computer readable medium for providing computer program code means comprising executable code for implementing the method recited in claim 1.

27. A computer program product as recited in claim 26, wherein the act of displaying the first category is performed by a preset, default setting.

28. A computer program product as recited in claim 26, wherein the act of displaying the first category is performed upon receipt of a first input command, wherein the first input command is received prior to the input command corresponding to the selection of the second category by the viewer.

29. A computer program product as recited in claim 26, further comprising executable code for implementing the act of displaying the menu system in a foreground display of the display screen while displaying a type of media in a background display of the display screen, and such that the menu system overlays at least a portion of the first type of media being displayed in the background display.

30. A computer program product as recited in claim 26, wherein the first and second categories include selectable subcategories, wherein at least one of the selectable subcategories corresponds to launching an application independent of the type of media displayed in the background display of the display screen.

31. A computer program product as recited in claim 29, wherein the first category corresponds to a first type of media that is displayable on the display screen, and wherein the second category includes options that correspond to a second type of media that is displayable on the display screen.

32. A method as recited in claim 1, wherein upon replacing the first category with the second category the method further includes displaying the first category with the second category on the display.

33. A method as recited in claim 1, wherein every subcategory associated with the second category is displayed by the menu system within the display screen at the same time.

34. A method as recited in claim 1, wherein the subcategories corresponding to the first category are different than the subcategories corresponding to the second category.

35. A method as recited in claim 34, wherein none of the subcategories corresponding to the first category are the same as the subcategories corresponding to the second category.

36. A method as recited in claim 1, wherein horizontal scrolling includes moving the display of at least some subcategories horizontally on the display screen.

37. A method as recited in claim 17, wherein every subcategory associated with the selected category is displayed by the menu system within the display semen at the same time.

38. A method as recited in claim 17, wherein the subcategories corresponding to the selected category are different than subcategories corresponding to another one of the plurality of the other categories.

39. A method as recited in claim 38, wherein none of the subcategories corresponding to the selected category are the same as the subcategories corresponding to said another one of the other categories.

40. A method as recited in claim 17, wherein horizontal scrolling includes moving the display of at least some subcategories horizontally on the display screen.

41. A method as recited in claim 1, wherein one of the subcategories comprises a selectable program listing option that when selected, causes an electronic program guide listing to be displayed, the electronic program guide listing comprising a listing of programming by program channel and program time.

42. A method as recited in claim 41, wherein the selectable program listing option, when selected, further causes the electronic program guide listing to be displayed at the same time that current programming is displayed and in a reduced size frame.

43. A method as recited in claim 41, wherein the selectable program listing option, when selected, further causes the electronic program guide listing to be displayed with information corresponding to only a single channel and that overlaps currently displayed programming that is displayed in a background that fills a full screen.

44. A method as recited in claim 1, wherein selection of one of the subcategories causes dimming of a currently displayed program that is displayed simultaneously with the menu system.

45. A method as recited in claim 1, wherein selection of a subcategory corresponding to television programming causes the user interface to display a menu that only corresponds to a single channel and that includes a title of a currently aired program and a title of a program that is scheduled to be aired next on the single channel, and without displaying additional titles or information corresponding to other channels.

* * * * *